US011834336B2

(12) United States Patent
Gao et al.

(10) Patent No.: US 11,834,336 B2
(45) Date of Patent: Dec. 5, 2023

(54) INDEPENDENT FREE-STANDING GRAPHENE FILM AND METHOD OF PREPARING THE SAME

(71) Applicant: ZHEJIANG UNIVERSITY, Hangzhou (CN)

(72) Inventors: Chao Gao, Hangzhou (CN); Li Peng, Hangzhou (CN); Lin Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 447 days.

(21) Appl. No.: 16/476,117

(22) PCT Filed: May 8, 2018

(86) PCT No.: PCT/CN2018/086085
§ 371 (c)(1),
(2) Date: Jul. 5, 2019

(87) PCT Pub. No.: WO2019/071943
PCT Pub. Date: Apr. 18, 2019

(65) Prior Publication Data
US 2020/0231444 A1 Jul. 23, 2020

(30) Foreign Application Priority Data

Oct. 13, 2017 (CN) .......................... 201710953503.4
Oct. 13, 2017 (CN) .......................... 201710953513.8
Oct. 13, 2017 (CN) .......................... 201710955058.5

(51) Int. Cl.
*C01B 32/184* (2017.01)
*C01B 32/198* (2017.01)

(52) U.S. Cl.
CPC .......... *C01B 32/184* (2017.08); *C01B 32/198* (2017.08); *C01B 2204/04* (2013.01)

(58) Field of Classification Search
CPC ............ H01L 29/7869; H01L 27/1225; H01L 29/78696; H01L 29/78648; H01L 29/24
See application file for complete search history.

(56) References Cited

U.S. PATENT DOCUMENTS

2014/0311967 A1* 10/2014 Grossman ............... C02F 1/442
427/244

FOREIGN PATENT DOCUMENTS

| CN | 103935994 A | 7/2014 |
|----|-------------|--------|
| CN | 104030275 * | 9/2014 |

(Continued)

OTHER PUBLICATIONS

International Search Report (PCT/CN2018/086085); dated May 8, 2018.

(Continued)

*Primary Examiner* — Tony Tran
(74) *Attorney, Agent, or Firm* — W&G Law Group

(57) ABSTRACT

Proposed is a method of preparing an independent free-standing graphene film. The graphene film is obtained by means of suction filtration of graphene oxide into a film, solid phase transfer, chemical reduction and the like steps. The graphene film is formed by means of physical cross-linking of a single layer of oxidized/reduced graphene oxide. The graphene film has a thickness of 10-2000 atomic layers. The graphene oxide film has a small thickness and a large number of defects inside, so that it has good transparency and excellent flexibility. On the basis of the transfer film-forming method above, an independent free-standing wrinkled graphene film having a nanoscale thickness is prepared by using a poor solvent and a special high temperature annealing process, and an independent free-standing foamed graphene film having a nanoscale thickness is (Continued)

obtained by using a film-forming thickness and a special high temperature annealing process.

1 Claim, 3 Drawing Sheets

(56) References Cited

FOREIGN PATENT DOCUMENTS

| | | | |
|---|---|---|---|
| CN | 104030275 A | 9/2014 | |
| CN | 104401987 A | 3/2015 | |
| CN | 106185901 A | 12/2016 | |
| CN | 107651673 A | 2/2018 | |
| CN | 107857251 A | 3/2018 | |
| CN | 107857252 A | 3/2018 | |

OTHER PUBLICATIONS

"A facile approach for the development of fine-tuned self-standing graphene oxide membranes and their gas and vapor separation performance Journal of Membrane Science" Romanos, G. et al. [Jul. 18, 2015].

* cited by examiner

INDEPENDENT FREE-STANDING GRAPHENE FILM AND METHOD OF PREPARING THE SAME

TECHNICAL FIELD

The present disclosure relates to a high-performance nanometer material and a method of preparing the same, in particular to an independent free-standing graphene film and a method of preparing the same.

BACKGROUND

In 2010, Andre GeiM and Konstantin Novoselov, two professors at Britain's Manchester University won the Nobel Prize in Physics for successful separation of stable graphene for the first time, which sets off a worldwide upsurge in graphene research. Graphene has excellent electrical properties (the electron mobility can be up to $2 \times 10^5$ cM$^2$/Vs at room temperature), outstanding thermal conductivity (5000 W/(MK), extraordinary specific surface area (2630 M$^2$/g), Young's modulus (1100 GPa) and breaking strength (125 GPa). The excellent electrical and thermal conductivity of graphene completely exceeds that of metal, and meanwhile, graphene has the advantages of high temperature resistance and corrosion resistance, while its good mechanical properties and relatively low density give it the potential to replace metal in the field of electrothermal materials.

The macroscopic assembly of graphene oxide or graphene nanosheets is the main application form of nanoscale graphene, and the commonly used preparation methods include filtration, doctor blade method, spin coating method, spray coating method, dip coating method and the like. Defects of graphene can be repaired through further high temperature treatment, and thus the electrical conductivity and thermal conductivity of the graphene film can be effectively improved, which can be widely used in smart phones, smart portable hardware, tablets, laptops and other portable electronic devices.

However, at present, the thickness of the graphene film sintered at a high temperature is generally above 1 um, and a large amount of gas is enclosed therein. In the process of high pressure pressing, there are closed pores retained in a form of plication, resulting in deterioration of the orientation of the graphene film and a decrease in density. Moreover, the AB stacking degree between layers is poor, which seriously affects the further improvement on the performance of the graphene film.

Furthermore, there has been no work reporting the preparation of nanoscale graphene films based on graphene oxide. Usually, the nanoscale graphene film generally refers to a polycrystalline graphene film prepared by a chemical vapor deposition method which is fixed on a certain substrate after being wetting or drying transferred, therefore, it is impossible to achieve independent free-standing in the air. This graphene film itself is in a polycrystalline structure whose properties are greatly affected by grain boundaries.

SUMMARY

It is an object of the present disclosure to provide a method of preparing an independent free-standing graphene film, aiming to overcome the deficiencies of the related art.

The present disclosure includes the following technical aspects:

Aspect One: a method of preparing an independent free-standing graphene film, includes steps of:

(1) formulating graphene oxide into an aqueous solution of graphene oxide with a concentration of 0.5-10 ug/mL, and performing suction filtration with mixed cellulose ester (MCE) as a substrate to form a film;

(2) placing a graphene oxide film attached to a MCE film in a closed container, and performing fumigation with HI at a high temperature of 60-100 degrees for 1-10 hours;

(3) coating a melted solid transfer agent uniformly on a surface of a reduced graphene oxide film by evaporation or casting, and performing cooling at room temperature slowly;

(4) placing the graphene film coated with the solid transfer agent in a good solvent for the MCE film, and removing the MCE film by etching; and (5) removing, by volatilizing at a temperature at which the solid transfer agent is volatilizable, the solid transfer agent from the obtained graphene film supported by the solid transfer agent to obtain an independent free-standing graphene film.

Further, the solid transfer agent is selected from a group consisting of, e.g., paraffin, aluminum chloride, iodine, naphthalene, arsenic trioxide, phosphorus pentachloride, acrylamide, ferric chloride, sulfur, red phosphorus, ammonium chloride, ammonium bicarbonate, potassium iodide, norbornylene, caffeine, melamine, water, rosin, tert-butanol, sulfur trioxide, and the like small molecule solid matters capable of sublimating or volatilizing under certain conditions.

Further, the good solvent for the MCE film is selected from a group consisting of acetone, n-butanol, ethanol, isopropanol, and combinations thereof.

Aspect Two: a method of preparing an independent free-standing wrinkled graphene film having a nanoscale thickness, includes steps of:

(1) formulating graphene oxide into an organic solution of graphene oxide with a concentration of 0.5-10 ug/mL, precipitating a graphene oxide sheet with a poor solvent, and finally performing suction filtration with anodic aluminum oxide (AAO) as a substrate to form a film;

(2) placing a graphene oxide film attached to an AAO film in a closed container, and performing fumigation with HI vapor at a high temperature of 60-100 degrees for 1-10 hours;

(3) coating a solid transfer agent uniformly on a surface of a graphene film by evaporation, casting and the like, and performing heating at a temperature of 5 degrees below a melting point of the solid transfer agent in such a manner that the solid transfer agent is solidified;

(4) leaving the graphene film coated with the solid transfer agent at room temperature, so that the graphene film automatically detaches from the AAO film;

(5) removing, by volatilizing at a temperature at which the solid transfer agent is volatilizable, the solid transfer agent from the obtained graphene film supported by the solid transfer agent to obtain an independent free-standing reduced graphene oxide film; and (6) placing the independent free-standing reduced graphene oxide film in a high temperature furnace for high temperature annealing, with an annealing temperature being 2400-3000° C., a holding time being 1-12 hours and a heating rate being smaller than or equal to 20° C./min.

Further, in the step 1, the organic solution is: acetone, tetrahydrofuran, DMF, methanol, ethanol, ethylene glycol, NMP, or DMSO, and the poor solvent is ethyl acetate, toluene, o-xylene, acetonitrile, ethyl acetate, diethyl ether, n-hexane and the like.

Further, in the step 4, the AAO film that does not detach from the graphene film is removed by etching using 1%-10% phosphoric acid for an etching time of 1-10 minutes.

Further, the solid transfer agent is selected from a group consisting of, e.g., paraffin, camphor, aluminum chloride, iodine, naphthalene, arsenic trioxide, phosphorus pentachloride, acrylamide, ferric chloride, sulfur, red phosphorus, ammonium chloride, ammonium bicarbonate, potassium iodide, norbornylene, caffeine, melamine, water, rosin, tert-butanol, sulfur trioxide and the like small molecule solid matters capable of sublimating or volatilizing under certain conditions.

Further, a sublimation temperature of the solid transfer agent is controlled to be below 320 degrees, and a sublimation pressure and an ambient oxygen-content for the solid transfer agent are dependent upon physical properties.

An independent free-standing wrinkled graphene film having a nanoscale thickness is proposed. The graphene film has a thickness of 16-130 nm and a transparency less than 50%, is consisted of randomly wrinkled graphene sheets, and has an AB stacking ratio of 50%-70%, the graphene sheets having few defects and $I_D/I_G$ of <0.01.

Aspect three: a method of preparing an independent free-standing foamed graphene film having a nanoscale thickness includes steps of:

(1) formulating graphene oxide into an aqueous solution of graphene oxide with a concentration of 0.5-10 ug/mL, and performing suction filtration with anodic taking anodic aluminum oxide (AAO) as a substrate to form a film having a thickness of 200-600 nm;

(2) placing a graphene oxide film attached to an AAO film in a closed container, and performing fumigation with HI vapor at a high temperature of 60-100 degrees for 1-10 hours;

(3) coating a solid transfer agent uniformly on a surface of a graphene film, and performing heating at a temperature of 5 degrees below a melting point of the solid transfer agent, in such a manner that the solid transfer agent is solidified;

(4) leaving the graphene film coated with the solid transfer agent at room temperature, so that the graphene film automatically detaches from the AAO film;

(5) removing, by slowly volatilizing at a temperature at which the solid transfer agent is volatilizable, the solid transfer agent from the obtained graphene film supported by the solid transfer agent to obtain an independent free-standing reduced graphene oxide film; and (6) placing the independent free-standing reduced graphene oxide film in a high temperature furnace for high temperature annealing, with an annealing temperature being 2400-3000° C., a holding time being 1-12 hours and a heating rate being smaller than or equal to 20° C./min.

Further, in the step 4, the AAO film that does not detach from the graphene film is removed by etching using 1%-10% phosphoric acid for an etching time of 1-10 minutes.

Further, the solid transfer agent is selected from a group consisting of, e.g., paraffin, camphor, aluminum chloride, iodine, naphthalene, arsenic trioxide, phosphorus pentachloride, acrylamide, ferric chloride, sulfur, red phosphorus, ammonium chloride, ammonium bicarbonate, potassium iodide, norbornylene, caffeine, melamine, water, rosin, tert-butanol, sulfur trioxide and the like small molecule solid matters capable of sublimating or volatilizing under certain conditions.

Further, a sublimation temperature of the solid transfer agent is controlled to be below 320 degrees, and a sublimation pressure and an ambient oxygen-content for the solid transfer agent are dependent upon physical properties.

An independent free-standing foamed graphene film having a nanoscale thickness is proposed. The graphene film has a thickness of 70-200 nm and has a layer of continuous bubbles inside; a wall surface of the bubbles is consisted of graphene sheets with a spacing between sheet-layers being 0.34 nm, the graphene sheets having few defects and $I_D/I_G$ of <0.01; and an AB stacking ratio is greater than 80%, and there is no wrinkle on the sheet-layers.

The beneficial effects of the present disclosure lies in that: the general solid transfer agent in the common technology is a polymer because it has properties of easy-to-operate and easy-to-fit and can be removed by solution etching or high temperature sintering. However, the surface tension will tear the graphene film when solution etching is performed. When it is taken out of the solution, it must be supported by a substrate. The presence of the solution results in that the graphene film cannot independently free-stand and must be attached to a surface of the substrate. High temperature sintering causes the graphene film to shrink, without maintaining the morphology of the graphene itself, and will also cause the graphene to attach to the substrate.

The present disclosure enables the nanoscale graphene film to be free-standing in the air by using a solid transfer agent that is easy to sublimate. In this process, the solid transfer agent is removed according to the principle of sublimation, and there is no problem of surface tension, so that the graphene film does not adhere to the substrate. The obtained graphene film has a controlled thickness which can reach 10 atomic layers, maintains the high orientation of the graphene, and has better transparency, which undoubtedly expands the potential application of the graphene film.

Based on the above transfer method, the present disclosure prepares an independent free-standing wrinkled graphene film having a nanoscale thickness utilizing a poor solvent and a special high temperature annealing process, and obtains an independent free-standing foamed graphene film having a nanoscale thickness utilizing a film-forming thickness and a special high temperature annealing process, thereby laying the foundation for the excellent performance of the graphene film. Moreover, the smaller the thickness is, the better the transparency is, which undoubtedly expands the potential application of graphene films. The construction of a single layer of bubbles provides a research unit for the controlled application of the function of the graphene.

DESCRIPTION OF EMBODIMENTS

Embodiment 1

(1) Formulating graphene oxide into an aqueous solution of graphene oxide with a concentration of 0.5 ug/mL, and performing suction filtration with mixed cellulose ester (MCE) as a substrate to form a film having a thickness of 30 to 50 nm.

(2) Placing the graphene oxide film attached to a MCE film in a closed container, and performing fumigation with HI at a high temperature of 60-100 degrees for 1 hour.

(3) Coating melted paraffin uniformly on a surface of a reduced graphene oxide film by evaporation, casting, or the like, and performing cooling at room temperature slowly.

(4) Washing slowly the graphene film coated with a solid transfer agent using ethanol to dissolve the MCE film.

Figure 1:
FIG. 1 is a schematic structural view of an independent free-standing graphene film prepared in Embodiment 1.

(5) Removing, by volatilizing slowly at a temperature of 120 degrees, the solid transfer agent from the obtained graphene film supported by the solid transfer agent to obtain an independent free-standing graphene film. The graphene film has a thickness of about 10 atomic layers and a transparency of 95%. There is no obvious wrinkle on the sheet-layer, as shown in FIG. 1.

Embodiment 2

(1) Formulating graphene oxide into an aqueous solution of graphene oxide with a concentration of 10 ug/mL, and performing suction filtration with mixed cellulose ester (MCE) as a substrate to form a film having a thickness of about 200 nm.

(2) Placing the graphene oxide film attached to a MCE film in a closed container, and performing fumigation with HI at a high temperature of 100 degrees for 10 hours.

(3) Coating melted rosin uniformly on a surface of a reduced graphene oxide film by evaporation, casting, or the like, and performing cooling at room temperature slowly.

(4) Placing the graphene film coated with a solid transfer agent in acetone to remove the MCE film.

Figure 2:
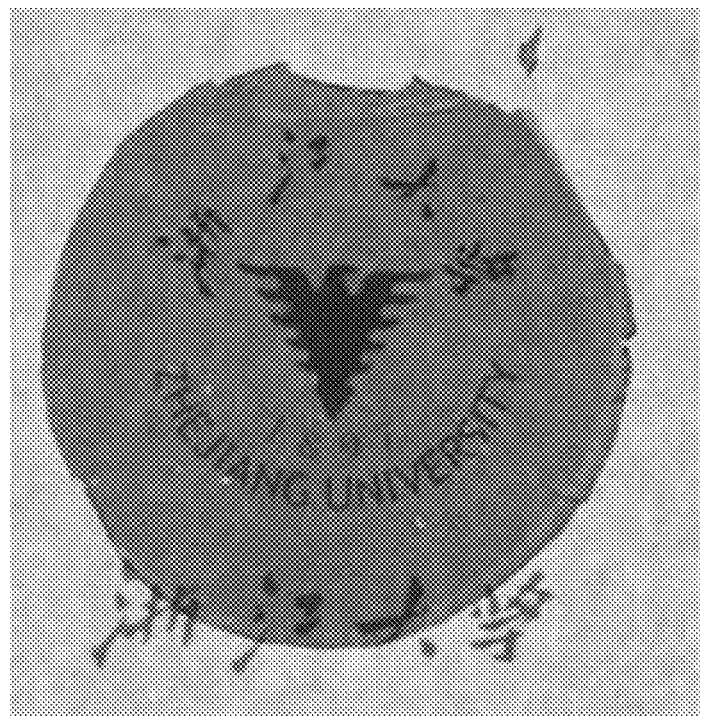
FIG. 2 is a schematic structural view of an independent free-standing graphene film prepared in Embodiment 2.
Figure 3:
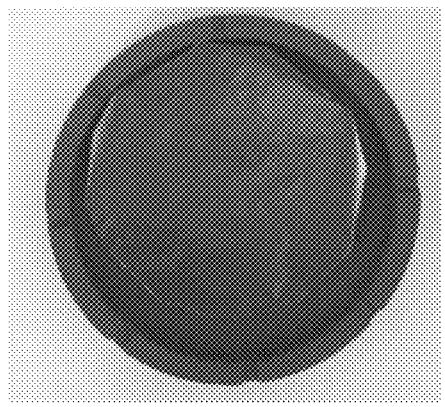
FIG. 3 is a nano graphene film (10 nm) with a solid transfer agent being removed.
Figure 4:
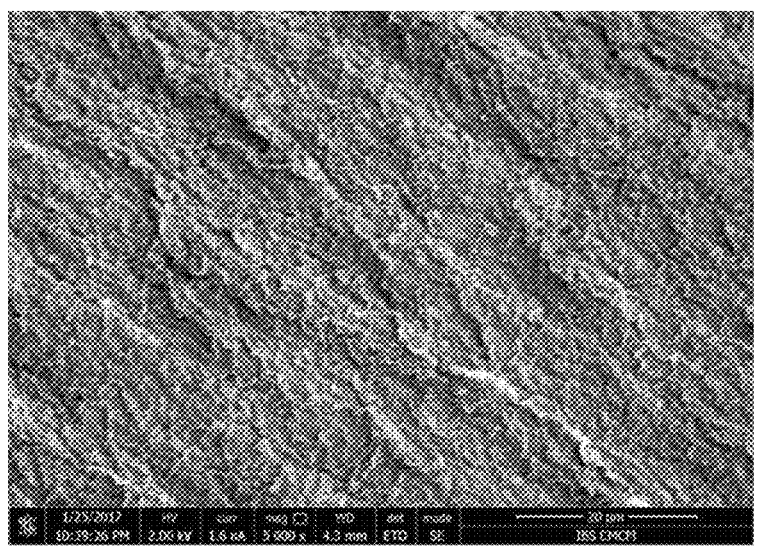
FIG. 4 is an independent free-standing wrinkled graphene film having a nanoscale thickness annealed at 3000 degrees.
Figure 5:
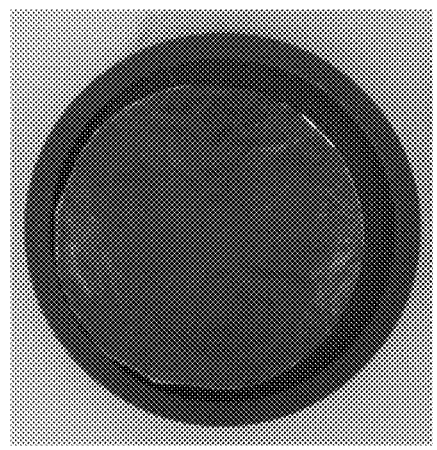
FIG. 5 is a nano graphene film (200 nm) with a solid transfer agent being removed.
Figure 6:
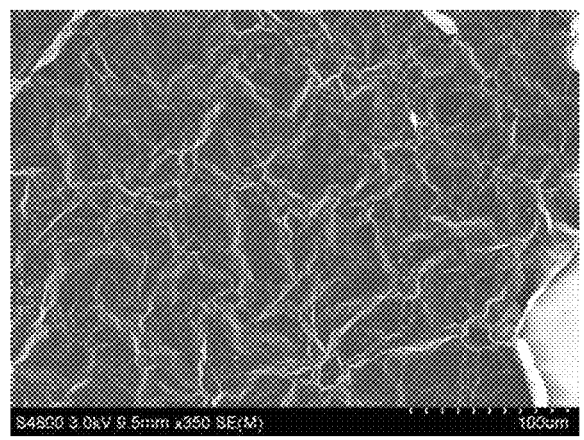
FIG. 6 is a surface morphology of an independent free-standing foamed graphene film having a nanoscale thickness annealed at 3000 degrees.

(5) Removing, by volatilizing slowly at a temperature of 300 degrees, the rosin from the obtained graphene film supported by the solid transfer agent to obtain an independent free-standing graphene film having a thickness of about 2000 atomic layers and a transparency of 10%, and there is no obvious wrinkle on the sheet-layer, as shown in FIG. 2.

Embodiment 3

(1) Formulating graphene oxide into an aqueous solution of graphene oxide with a concentration of 8 ug/mL, and performing suction filtration with mixed cellulose ester (MCE) as a substrate to form a film having a thickness of 100 nm.

(2) Placing the graphene oxide film attached to a MCE film in a closed container, and performing fumigation with HI at a high temperature of 80 degrees for 8 hours.

(3) Coating melted norbornylene uniformly on a surface of a reduced graphene oxide film by evaporation, casting, or the like, and performing cooling at room temperature slowly.

(4) Placing the graphene film coated with a solid transfer agent in isopropyl alcohol to remove the MCE film.

(5) Removing, by volatilizing slowly at a temperature of 100 degrees, the solid transfer agent from the obtained graphene film supported by the solid transfer agent to obtain an independent free-standing graphene film having a thickness of about 1000 atomic layers and a transparency of 6%, and there is no obvious wrinkles on the sheet-layer.

Embodiment 4

(1) Formulating graphene oxide into a DMF solution of graphene oxide with a concentration of 0.5 ug/mL, precipitating slowly a graphene oxide sheet with ethyl acetate, and performing suction filtration with anodic aluminum oxide (AAO) as a substrate to form a film.

(2) Placing the graphene oxide film attached to an AAO film in a closed container, and performing fumigation with HI vapor at a temperature of 60 degrees for 1 hour.

(3) With respect to the above-mentioned reduced graphene oxide film, coating camphor serving as a solid transfer agent uniformly on a surface of the graphene film by a method of sublimation and evaporation at 100° C., and performing heating at a temperature of 5 degrees below a melting point of the solid transfer agent for a period of time. Leaving the graphene film coated with the solid transfer agent at room temperature, so that graphene film automatically detaches from the AAO film.

(4) Removing, by volatilizing slowly at room temperature, the solid transfer agent from the obtained graphene film supported by the solid transfer agent to obtain an independent free-standing reduced graphene oxide film.

(5) Placing the independent free-standing reduced graphene oxide film in a high temperature furnace for high temperature annealing, with an annealing temperature being 3000° C., a holding time being 1 hour and a heating rate being 20° C./min.

The obtained graphene film can be independently free-standing in the air, and has a thickness of 130 nm and a transparency of 47%, can be consisted of randomly wrinkled graphene sheets, and has an AB stacking ratio of 50%. The graphene sheet has few defects and $I_D/I_G$ of <0.01.

Embodiment 5

(1) Formulating graphene oxide into a DMSO solution of graphene oxide with a concentration of 10 ug/mL, precipitating slowly a graphene oxide sheet with ethyl acetate, and performing suction filtration with anodic aluminum oxide (AAO) as a substrate to form a film.

(2) Placing the graphene oxide film attached to an AAO film in a closed container, and performing fumigation with HI vapor at a temperature of 100 degrees for 5 hours.

(3) With respect to the above-mentioned reduced graphene oxide film, coating paraffin serving as a solid transfer agent uniformly on a surface of the graphene film by low temperature melting coating (52 degrees), and performing heating at a temperature of 5 degrees below a melting point of the solid transfer agent for a period of time. Leaving the graphene film coated with the solid transfer agent at room temperature, so that the graphene film automatically detaches from the AAO film.

(4) Removing, by volatilizing slowly at 120° C., the solid transfer agent from the obtained graphene film supported by the solid transfer agent to obtain an independent free-standing reduced graphene oxide film; if the reduction in step 2 is uneven or there is hydrogen iodide vapor directly contacting with the AAO film, the graphene will not automatically detach from the AAO film during the transfer of the solid transfer agent, and thus at this time, the AAO film would need to be removed by etching with 5% phosphoric acid for an etching time of 2 minutes.

(5) Placing the independent free-standing reduced graphene oxide film in a high temperature furnace for high temperature annealing, with an annealing temperature being 2400° C., a holding time being 12 hours and a heating rate being 20° C./min.

The obtained graphene film can be independently free-standing in the air and has a thickness of 16 nm and a transparency of 48%, can be consisted of randomly wrinkled graphene sheets, and has an AB stacking ratio of 70%. The graphene sheet has few defects and $I_D/I_G$ of <0.01.

Embodiment 6

(1) Formulating graphene oxide into an acetone solution of graphene oxide with a concentration of 2 ug/mL, precipitating slowly a graphene oxide sheet with n-hexane, and performing suction filtration with anodic aluminum oxide (AAO) as a substrate to form a film.

(2) Placing the graphene oxide film attached to an AAO film in a closed container, and performing fumigation with HI vapor at a temperature of 80 degrees for 10 hours.

(3) With respect to the above-mentioned reduced graphene oxide film, coating aluminum chloride serving as a solid transfer agent uniformly on a surface of the graphene film by solution coating, and performing heating at a temperature of 5 degrees below a melting point of the solid transfer agent for a period of time. Leaving the graphene film coated with the solid transfer agent at room temperature, so that the graphene film automatically detaches from the AAO film.

(4) Removing, by volatilizing slowly at 180° C., the solid transfer agent from the obtained graphene film supported by the solid transfer agent to obtain an independent free-standing reduced graphene oxide film; if the reduction in step 2 is uneven or there is hydrogen iodide vapor directly contacting with the AAO film, the graphene will not automatically detach from the AAO film during the transfer of the solid transfer agent, and thus at this time, the AAO film would need to be removed by etching with 1-10% phosphoric acid for an etching time of 1-10 minutes.

(5) Placing the independent free-standing reduced graphene oxide film in a high temperature furnace for high temperature annealing, with an annealing temperature being 2600° C., a holding time being 2 hours and a heating rate being 10° C./min.

The obtained graphene film can be independently free-standing in the air and has a thickness of 39 nm and a transparency of 36%, can be consisted of randomly wrinkled graphene sheets, and has an AB stacking ratio of 66%. The graphene sheet has few defects and $I_D/I_G$ of <0.01.

Embodiment 7

(1) Formulating graphene oxide into a tetrahydrofuran solution of graphene oxide with a concentration of 10 ug/mL, precipitating slowly a graphene oxide sheet with toluene, and performing suction filtration with anodic aluminum oxide (AAO) as a substrate to form a film.

(2) Placing the graphene oxide film attached to an AAO film in a closed container, and performing fumigation with HI vapor at a temperature of 90 degrees for 10 hours.

(3) With respect to the above-mentioned reduced graphene oxide film, coating sulfur serving as a solid transfer agent uniformly on a surface of the graphene film by high temperature casting (130° C.), and performing heating at a temperature of 5 degrees below a melting point of the solid transfer agent for a period of time. Leaving the graphene film coated with the solid transfer agent at room temperature, so that the graphene film automatically detaches from the AAO film.

(4) Removing, by volatilizing slowly through a method of low pressure sublimation, the solid transfer agent from the obtained graphene film supported by the solid transfer agent to obtain an independent free-standing reduced graphene oxide film; if the reduction in step 2 is uneven or there is hydrogen iodide vapor directly contacting with the AAO film, the graphene will not automatically detach from the AAO film during the transfer of the solid transfer agent, and thus at this time, the AAO film would need to be removed by etching with 1-10% phosphoric acid for an etching time of 1-10 minutes.

(5) Placing the independent free-standing reduced graphene oxide film in a high temperature furnace for high temperature annealing, with an annealing temperature being 2500° C., a holding time being 12 hours and a heating rate being 10° C./min.

The obtained graphene film can be independently free-standing in the air and has a thickness of 109 nm and a transparency of 41%, can be consisted of randomly wrinkled graphene sheets, and has an AB stacking ratio of 59%. The graphene sheet has few defects and $I_D/I_G$ of <0.01.

Embodiment 8

(1) Formulating graphene oxide into an aqueous solution of graphene oxide with a concentration of 0.5 ug/mL, and performing suction filtration with anodic aluminum oxide (AAO) as a substrate to form a film having a thickness of 600 nm.

(2) Placing the graphene oxide film attached to an AAO film in a closed container, and performing fumigation with HI vapor at a temperature of 60° C. for 10 hours.

(3) With respect to the above-mentioned reduced graphene oxide film, coating camphor serving as a solid transfer agent uniformly on a surface of the graphene film by a method of sublimation and evaporation at 100° C., and performing heating at a temperature of 5 degrees below a melting point of the solid transfer agent for a period of time. Leaving the graphene film coated with the solid transfer agent at room temperature, so that the graphene film automatically detaches from the AAO film.

(4) Removing, by volatilizing slowly at a temperature at which the solid transfer agent is slowly volatilizable, the solid transfer agent from the obtained graphene film supported by the solid transfer agent to obtain an independent free-standing reduced graphene oxide film.

(5) Placing the independent free-standing reduced graphene oxide film in a high temperature furnace for high temperature annealing, with an annealing temperature being 3000° C., a holding time being 1 hour and a heating rate being 20° C./min.

The obtained graphene film can be independently free-standing in the air and has a transparency of 46% and a thickness of 70 nm, and there is only one layer of continuous bubbles inside; a wall surface of the bubbles is consisted of graphene sheets with a spacing between sheet-layers being 0.34 nm, and the graphene sheet has few defects and $I_D/I_G$ of <0.01; and an AB stacking ratio is greater than 80% and the sheet-layers are wrinkle free.

Embodiment 9

(1) Formulating graphene oxide into an aqueous solution of graphene oxide with a concentration of 10 ug/mL, and performing suction filtration with anodic aluminum oxide (AAO) as a substrate to form a film having a thickness of 200 nm.

(2) Placing the graphene oxide film attached to an AAO film in a closed container, and performing fumigation with HI vapor at a temperature of 100° C. for 1 hour.

(3) With respect to the above-mentioned reduced graphene oxide film, coating paraffin serving as a solid transfer agent uniformly on a surface of the graphene film by a method of low temperature melting coating (52° C.), and performing heating at a temperature of 5 degrees below a melting point of the solid transfer agent for a period of time. Leaving the graphene film coated with the solid transfer agent at room temperature, so that the graphene film automatically detaches from the AAO film.

(4) Removing, by volatilizing slowly at 120° C., the solid transfer agent from the obtained graphene film supported by the solid transfer agent to obtain an independent free-standing reduced graphene oxide film; if the reduction in step 2 is uneven or there is hydrogen iodide vapor directly contacting with the AAO film, the graphene will not automatically detach from the AAO film during the transfer of the solid transfer agent, and thus at this time, the AAO film would need to be removed by etching with 5% phosphoric acid for an etching time of 2 minutes.

(5) Placing the independent free-standing reduced graphene oxide film in a high temperature furnace for high temperature annealing, with an annealing temperature being 2400° C., a holding time being 12 hours and a heating rate being 15° C./min.

The obtained graphene film can be independently free-standing in the air and has a transparency of 31% and a thickness of 138 nm, and there is only one layer of continuous bubbles inside; a wall surface of the bubbles is consisted of graphene sheets with a spacing between the sheet-layers being 0.34 nm, and the graphene sheet has few defects and $I_D/I_G$ of <0.01; and an AB stacking ratio is greater than 80% and the sheet-layers are wrinkle free.

Embodiment 10

(1) Formulating graphene oxide into an aqueous solution of graphene oxide with a concentration of 2 ug/mL, and performing suction filtration with anodic aluminum oxide (AAO) as a substrate to form a film having a thickness of 280 nm.

(2) Placing the graphene oxide film attached to an AAO film in a closed container, and performing fumigation with HI vapor at a temperature of 80° C. for 9 hours.

(3) With respect to the above-mentioned reduced graphene oxide film, coating aluminium chloride serving as a solid transfer agent uniformly on a surface of the graphene film by a method of solution coating, and performing heating at a temperature of 5 degrees below a melting point of the solid transfer agent for a period of time. Leaving the graphene film coated with the solid transfer agent at room temperature, so that the graphene film automatically detaches from the AAO film.

(4) Removing, by volatilizing slowly at 180° C., the solid transfer agent from the obtained graphene film supported by the solid transfer agent to obtain an independent free-standing reduced graphene oxide film; if the reduction in step 2 is uneven or there is hydrogen iodide vapor directly contacting with the AAO film, the graphene will not automatically detach from the AAO film during the transfer of the solid transfer agent, and thus at this time, the AAO film would need to be removed by etching with 1-10% phosphoric acid for an etching time of 1-10 minutes.

(5) Placing the independent free-standing reduced graphene oxide film in a high temperature furnace for high temperature annealing, with an annealing temperature being 2600° C., a holding time being 2 hours and a heating rate being 10° C./min.

The obtained graphene film can be independently free-standing in the air and has a transparency of 15% and a thickness of 198 nm, and there is only one layer of continuous bubbles inside; a wall surface of the bubbles is consisted of graphene sheets with a spacing between the sheet-layers being 0.34 nm, and the graphene sheet has few defects and $I_D/I_G$ of <0.01; and an AB stacking ratio is greater than 80% and the sheet-layers are wrinkle free.

Embodiment 11

(1) Formulating graphene oxide into an aqueous solution of graphene oxide with a concentration of 10 ug/mL, and performing suction filtration with anodic aluminum oxide (AAO) as a substrate to form a film having a thickness of 400 nm.

(2) Placing the graphene oxide film attached to an AAO film in a closed container, and performing fumigation with HI vapor at a temperature of 60° C. for 8 hours.

(3) With respect to the above-mentioned reduced graphene oxide film, coating sulfur serving as a solid transfer agent uniformly on a surface of the graphene film by a method of high temperature casting (130° C.), and performing heating at a temperature of 5 degrees below a melting point of the solid transfer agent for a period of time. Leaving the graphene film coated with the solid transfer agent at room temperature, so that the graphene film automatically detaches from the AAO film.

(4) Removing, by volatilizing slowly through a method of low pressure sublimation, the solid transfer agent from the obtained graphene film supported by the solid transfer agent to obtain an independent free-standing reduced graphene oxide film; if the reduction in step 2 is uneven or there is hydrogen iodide vapor directly contacting with the AAO film, the graphene will not automatically detach from the AAO film during the transfer of the solid transfer agent, and thus at this time, the AAO film would need to be removed by etching with 1-10% phosphoric acid for an etching time of 1-10 minutes.

(5) Placing the independent free-standing reduced graphene oxide film in a high temperature furnace for high temperature annealing, with an annealing temperature being 2500° C., a holding time being 8 hours and a heating rate being 20° C./min.

The obtained graphene film can be independently free-standing in the air, and has a transparency of 22% and a thickness of 90 nm, and there is only one layer of continuous bubbles inside; a wall surface of the bubbles is consisted of graphene sheets with a spacing between the sheet-layers being 0.34 nm, and the graphene sheet has few defects and $I_D/I_G$ of <0.01; and an AB stacking ratio is greater than 80% and the sheet-layers are wrinkle free.

Finally, it should be noted that the thickness of the graphene film in step 1, the temperature for high temperature annealing and the heating rate are keys to constructing a single layer of bubbles, while violation of these conditions will result in disorganized bubbles, which makes it impossible to constitute a research unit for graphene function.

What is claimed is:

1. A method of preparing an independent free-standing graphene film, wherein comprising steps in sequential order of:
   (1) formulating graphene oxide into an aqueous solution of graphene oxide with a concentration of 0.5 μg/mL, and performing suction filtration with mixed cellulose ester (MCE) as a substrate to form a film;
   (2) placing a graphene oxide film attached to a MCE film in a closed container, and performing fumigation with hydrogen iodine (HI) at a high temperature of 60° C. for 1 hour;
   (3) coating a melted solid transfer agent uniformly on a surface of a reduced graphene oxide film by evaporation or casting, and performing cooling at room temperature slowly;
   (4) placing the graphene film coated with the solid transfer agent in a good solvent for the MCE film, and removing the MCE film by etching; and
   (5) removing, by volatilizing at a temperature at which the solid transfer agent is volatilizable, the solid transfer agent from the obtained graphene film supported by the solid transfer agent to obtain an independent free-standing graphene film;
   wherein the solid transfer agent is paraffin; and
   wherein the good solvent for the MCE film is ethanol.

* * * * *